United States Patent [19]

Yamashita et al.

[11] 3,836,801
[45] Sept. 17, 1974

[54] STATOR FOR DC MACHINES
[75] Inventors: Seizi Yamashita; Kazuo Onishi, both of Hitachi, Japan
[73] Assignee: Hitachi, Ltd., Tokyo, Japan
[22] Filed: Mar. 7, 1973
[21] Appl. No.: 338,939

[52] U.S. Cl. ............................. 310/154, 310/254
[51] Int. Cl. ............................................ H02k 23/04
[58] Field of Search ...... 310/154, 155, 40 MM, 254

[56] References Cited
UNITED STATES PATENTS
2,048,161  7/1936  Klaiber ............................. 310/154
2,513,226  6/1950  Wylie ............................... 310/154
2,520,828  8/1950  Bertschi ............................ 310/155
3,293,466  12/1966  Baudot ............................. 310/154
3,500,090  3/1970  Baermann ......................... 310/154

Primary Examiner—Mark O. Budd
Attorney, Agent, or Firm—Craig & Antonelli

[57] ABSTRACT

A stator of a DC machine comprising at least a pair of magnetic poles extending radially at a small distance to the peripheral portion of the armature and arranged equidistantly from each other, and at least two magnets each interposed between the magnetic poles in the manner so that each magnetic pole is sandwiched between the poles of the same polarity of those of the magnets which hold the magnetic pole therebetween.

6 Claims, 9 Drawing Figures

STATOR FOR DC MACHINES

BACKGROUND OF THE INVENTION

1. FIELD OF THE INVENTION

This invention relates to the construction of the stator which constitutes the magnetic circuit of a DC machine, or more in particular to the stator suitable used for what are called "low inertial motors," such as a cylindrical armature motor, a cup-type armature motor and a smooth core armature motor and the like.

DECRIPTION OF THE PRIOR ART

The prior art electric motor of this type is of such a construction that a plurality of magnets are fixed in the inside of the magnetic frame at equal distances from each other and a pole shoe is attached to the tip of each of the magnets at a short distance to the armature.

In such a conventional motor, it is well known that an improved performance of the motor is achieved by increasing the density of the magnetic flux passing through the air gap between the pole shoes and the armature. This object has so far been achieved to some degree by employing magnets of improved material. Ferrite or alnico presently in use for the magnets is magnetically saturated at a relatively low level of magnetic flux density, thus imposing a limitation to the improvement in the performance of the motor by the material of the magnets.

Under the circumstances, it is impossible to improve the performance of the motor beyond the present level, that is, to increase the density of magnetic flux passing the air gap between the magnetic poles and the armature other than by improving the construction itself of the motor.

SUMMARY OF THE INVENTION

Accordingly, it is an object of the invention to provide a simple stator having an excellent performance for use in the motors mentioned above. A feature of the invention is the fact that a DC motor having such an improved stator is characterized in that a plurality of magnetic poles constituting part of the stator are arranged at a short distance to the peripheral portion of the armature radially thereof and a plurality of magnets are interposed between the magnetic poles in the manner so that each magnetic pole is sandwiched between the poles of the same polarity of said magnets.

Another feature of the invention is the fact that each of the magnets interposed between the magnetic poles is of a laminated structure consisting of a plurality of magnet units, one of which disposed nearer to the center of the motor is larger in the value of coercive force than the magnet unit disposed farther from the center of the same.

DESCRIPTION OF THE PREFERRED EMBODIMENTS

Figure 1:
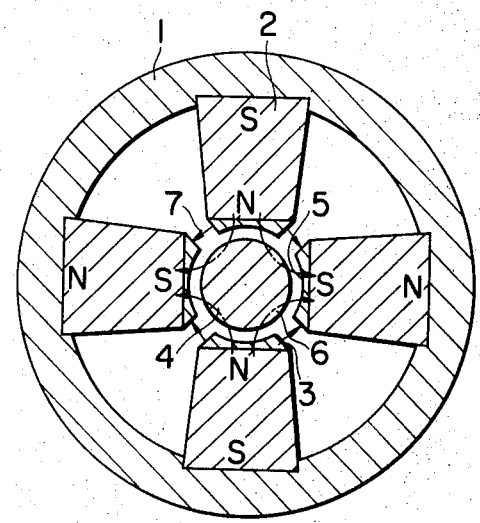
FIG. 1 is a diagram showing a stator used in a conventional DC motor.

Referring to FIG. 1 showing the construction of a conventional motor, magnets 2 are fixed equidistantly on the inside of a magnetic frame with pole shoes 3 being fixedly attached to the inner tips of the magnets 2 at a short distance to the peripheral portion of an armature 4.

A possible method of improving the construction of this motor is to increase the sectional area A of the magnets or to reduce the leakage of the magnetic flux between the pole shoes.

Figure 2A:
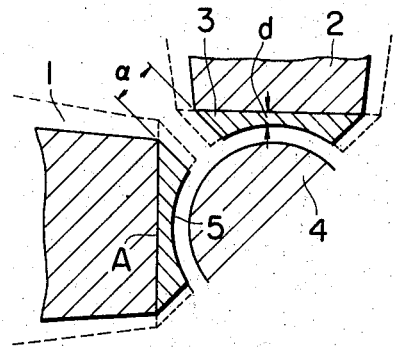
FIG. 2 is a diagram showing a suggested improvement on the conventional DC electric motor.
Figure 2B:
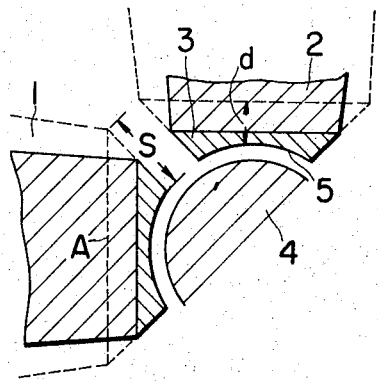

The enlargement of the sectional area A of the magnets may be achieved either by enlarging the inner circumference 5 of the pole shoes 3 as shown in FIG. 2a or by increasing the thickness d of the pole shoes as shown in FIG. 2b. However, the former method causes the space $\alpha$ between the pole shoes to be reduced, while the latter method gives rise to an increased area S of each pole shoe facing an adjacent pole shoe, both resulting in an increased amount of the leakage flux 7 thereby to offset the advantage of the enlarged sectional area. On the other hand, the leakage of the magnetic flux may be reduced in one of the following ways: to enlarge the space between the pole shoes or to reduce the area S of each pole shoe facing an adjacent pole shoe. These alternatives cause the sectional area A of each magnet to be undesirably reduced.

As can be seen from the above description, in the prior art DC motor, the enlargement of the sectional area of the magnets results in the increase of the magnetic flux, while the reconstruction to reduce the leakage magnetic flux causes the sectional area of each magnet to be reduced. Thus, both of the above-mentioned alternatives have their own limit in the improvement of performance.

In this connection, a method has been suggested in which additional magnets or magnet units have been inserted between the pole shoes so as to repel the leakage magnetic flux into place. According to this method, however, the construction of the motor is considerably complicated and the assembly work of the motor requires a great skill.

Some embodiments of the invention will be now explained with reference to the attached drawings.

Figure 3:
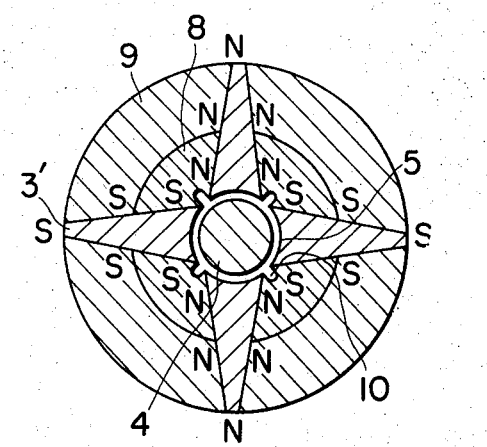
FIGS. 3 to 7 are diagrams showing embodiments of the invention.

In FIG. 3, the reference numeral 3' shows tapered magnetic poles extending radially with their inner ends having the inner circumference 5. The motor of FIG. 3 is provided with four magnetic poles which are arranged along the peripheral portion of the armature 4 at equal distance to each other as already mentioned. The numerals 8 and 9 show fan-shaped magnet units, the former being a ferrite magnet or the like having a large coercive force and the latter being a usual magnet of alnico or the like. These magnet units are magnetized in the circumferencial direction in the manner so that each of the magnetic poles is sandwiched between the poles of the same polarity of the adjacent magnets which hold the magnetic pole therebetween.

Now, the permeance factor p is expressed as $$p = P \, (lm/Sm)$$

where P is the permeance of the load magnetic circuit for a magnet and $lm$ and $Sm$ are the length and the sectional area of the magnet respectively.

In the embodiment of this invention, the value of the permeance P of the load magnetic circuit for a magnet unit is considered to be substantially constant independently of the position of the magnet unit, because the magnet pole is made of a soft magnetic material. Therefore, in this arrangement, the closer the magnetic path gets to the outer periphery of the fan-shaped magnet units assembly 8 and 9, the larger the permeance factor p becomes in proportion to the length $lm$, so that a large amount of magnetic flux flows out of the magnet unit 9 which is nearer to the outer periphery toward the magnetic pole 3'. Then it passes through the magnetic pole 3' to the center of the motor while part of the flux leaks to the outside by way of the outer periphery of the motor.

Meanwhile, the reluctance R is expressed as $$R = l/\mu_s \cdot \mu_o \cdot S$$

where $l$ is the length of magnetic path, $\mu_s$ the specific permeability, $\mu_o$ the permeability of a vacuum. Since the length of the magnetic path of the leakage flux in the peripheral portion of the motor, is far greater, the reluctance of the same becomes larger than those of the air gap between the magnetic pole 3' and the armature 4, resulting in a small amount of leakage magnetic flux in the peripheral portion of the motor.

Part of the magnetic flux from the magnet unit 9 tends to leak out by way of the sides of the magnetic pole 3' while passing therethrough. In the embodiment under consideration, however, the leakage flux is repelled by the magnet unit 8 having large coercive force and provided inwardly of the magnetic leakage path, with the result that the magnetic flux is forced toward the armature 4 through the magnetic pole 3'. At the same time, part of the magnetic flux in the magnet unit 8 flows through the magnetic pole 3' to the armature 4, thereby causing a large amount of magnetic flux flowing the space between the magnetic pole 3' and the armature 4. This will be easily understood from the fact that the sectional area of the magnets for each pole is double that of each of the fan-shaped magnet units 8 and 9. Namely, since the magnetic flux flows into the magnetic pole 3' from both of the right and left fan-shaped magnet units assemblies 8 and 9, two times amount of magnetic flux as that flows into from one magnet units assembly passes through the magnetic pole and flows into the air gap.

It is to be noted here that each of the fan-shaped magnets is made of a laminated structure consisting of a plurality of magnet units. The purpose of increasing the sectional area of the magnets may be achieved by providing a single magnet unit. But this is necessarily accompanied by the difference in the value of the permeance factor between the inner and outer portions of the magnet in the radial direction.

In other words, the effective length of the magnet is different at the inner and outer portions thereof for the same magnetomotive force and therefore the magnetic flux from the outer portion of the magnet leak through the inner portion thereof between adjacent magnetic poles.

This invention is characterized by the additional magnet unit 8 which is provided in place of the inner portion of a single-unit magnet to repel such leakage flux. Therefore, regardless of the magnetic flux the magnet unit 8 consists of ferrite or other materials of a large coercive force.

Figure 8:
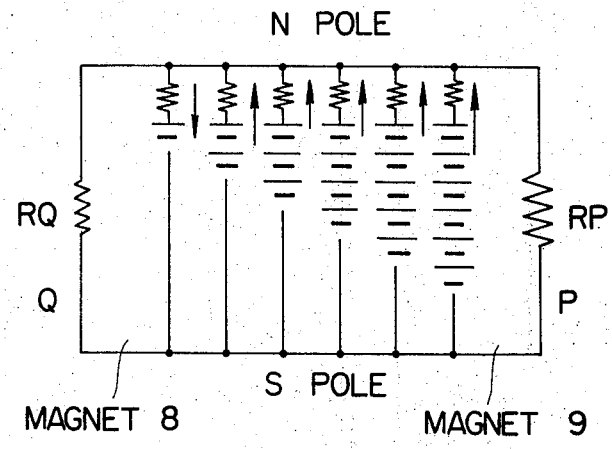
FIG. 8 is a diagram showing an equivalent electrical circuit of the stator according to the present invention.

An electrical equivalent circuit of the abovementioned magnet arrangement is illustrated in FIG. 8. In this circuit, a plurality of batteries are connected in parallel with one other between the magnetic poles. The voltage of each battery is less the nearer it is to the inner portion Q of the magnet where the permeance factor is smaller than at the outer portion P thereof. The symbol RP shows the reluctance of the magnetic path of the leakage magnetic flux in the vicinity of the outer peripheral portion of the magnet which is far greater than the magnetic reluctance RQ of the magnetic path in the air gap between the armature 4 and the pole 3'.

To locate a magnet unit pole 8 of a large coercive force at the vicinity of the inner periphery of the magnet units assembly is equivalent to make large the value of the voltage of the corresponding battery in the drawings. The consideration on the electrical equivalent circuit makes it clear that the magnetic flux flowing into the magnet pole from the magnet unit 9 mounted at the vicinity of the outer periphery of the magnet assembly is prevented from leaking out from the magnet pole at the inner peripheral portion of the magnet assembly by thus arranging the magnet unit 8. At the innermost peripheral portion of the magnet, the magnetomotive force sometimes exceeds the coercive force of the magnet between the adjacent magnetic poles, causing the leakage of magnetism. This leakage is, however, negligibly small.

Figure 4:
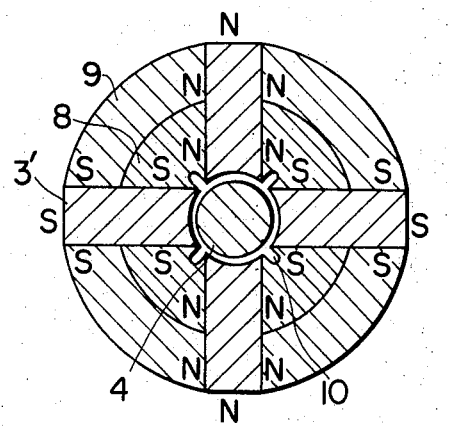

FIG. 4 illustrates another embodiment of the invention, in which each magnet has a corner of a right angle to facilitate the manufacture of the motor.

Figure 5:
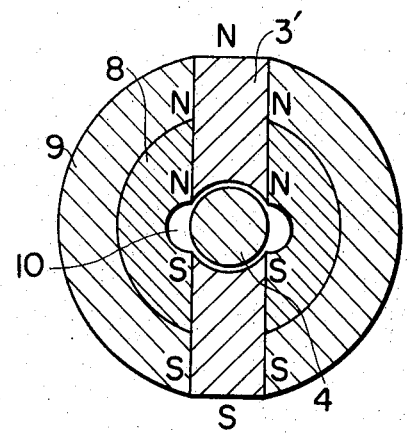

Still another embodiment of the invention is illustrated in FIG. 5 in which the embodiment of FIG. 4 is applied to the two-pole stator instead of the four-pole stator.

Figure 6:
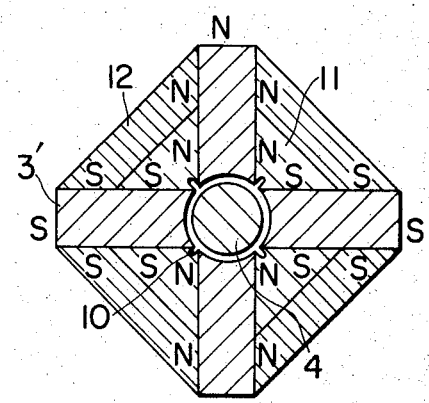
Figure 7:
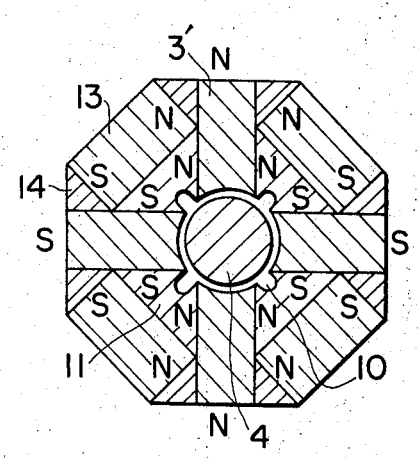

Still other embodiments of the invention are shown in FIGS. 6 and 7 in which the use of square anisotropic magnets 11, 12 and 13 resulted in an improved property of the magnets and hence improved characteristics of the motor. The reference numeral 14 shows spacers.

The numberal 10 which is commonly used for all of the above-mentioned embodiments shows recesses through which coils for magnetizing the magnets 8, 9, 11, 12, and 13 are passed. These recesses are so useful that after magnetizing the magnets they are utilized as paths for motor-cooling air.

It will be understood from the above description that according to the present invention a plurality of magnetic poles are arranged equidistantly radially around the armature and a plurality of laminated magnets are interposed between the magnetic poles in the manner so that each magnetic pole is sandwiched between the poles of the same polarity of adjacent magnets. Further, each of the laminated magnets consists of an inner magnet unit and an outer magnet unit, the inner magnet unit being larger in the value of the coercive force than the outer magnet unit, so that it is possible to supply a large amount of magnetic flux to the space between the magnetic poles and the armature.

It will thus be seen that the objects set forth above, among those made apparent from the preceding description, are efficiently attained, and since certain changes may be made in the above constructions without departing from the spirit of the invention, it is intended that all matter contained in the above description, disclosed in the following scope of claims or shown in the accompanying drawings shall be interpreted as illustrative and not in a limiting sense.

We claim:

1. A stator of a direct-current machine having an armature, said stator comprising at least a pair of magnetic poles extending radially at a small distance to the outer periphery of the armature and arranged equidistantly to each other, and at least two magnets each interposed between said magnetic poles in the manner so that each of said magnetic poles is sandwiched between the poles of the same polarity of those of said magnets which hold said each of said magnetic poles therebetween, each of said magnets including at least two magnet units disposed in parallel between said magnetic poles, the inner magnet unit of the two disposed nearer to said armature having a larger coercive force than the outer magnet unit of the two disposed nearer to the outer periphery of the machine.

2. A stator of a direct-current machine according to claim 2, in which said inner magnet unit consists of a ferrite material and said outer magnet unit consists of an alnico material.

3. A stator of a direct-current machine according to claim 1, in which a recess is provided in each of said inner magnet units at the opposing end thereof to the armature.

4. A stator of a direct-current machine according to claim 2, in which a recess is provided in each of said inner magnet units at the opposing end thereof to the armature.

5. A stator of a direct-current machine according to claim 1, in which each of said magnet units is magnetized in the circumferencial direction and forming a fan-shaped section in the space between said magnetic poles.

6. A stator of a direct-current machine according to claim 1, in which each of said magnets is composed of said at least two magnet units so as to form a polygonal section in the space between said magnetic poles.

* * * * *